Figure 1:
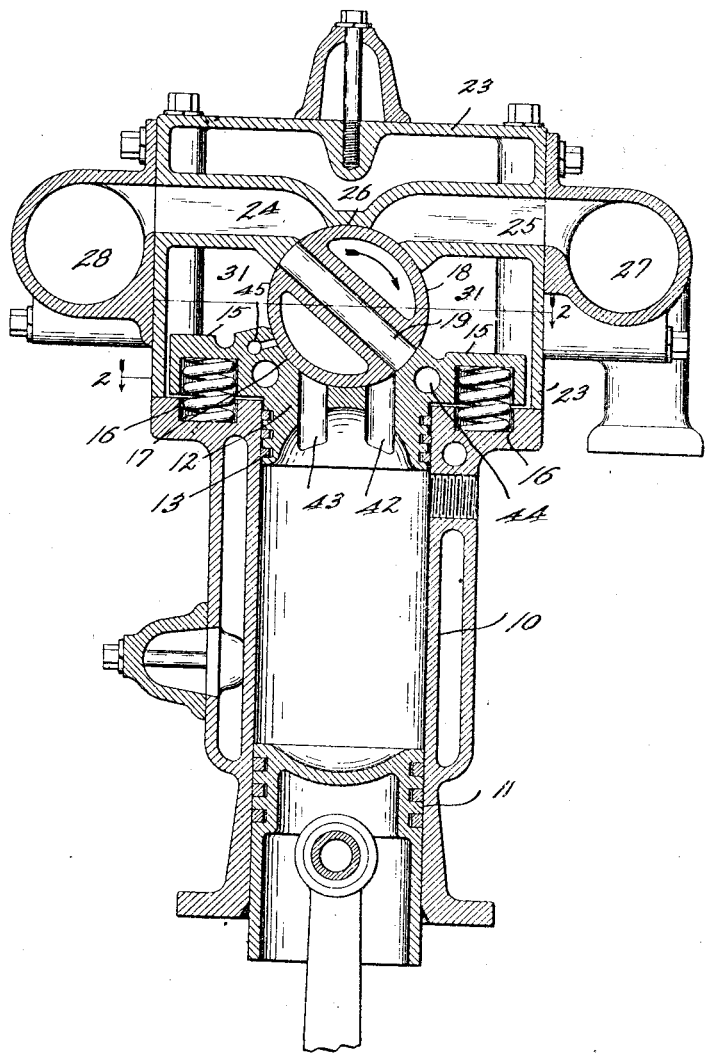

H. C. BLYE.
INTERNAL COMBUSTION ENGINE.
APPLICATION FILED MAR. 1, 1915.

1,181,974.

Patented May 2, 1916.
2 SHEETS—SHEET 1.

WITNESSES:
Frank A. Sahle
Josephine Gasper

INVENTOR
Herman C. Blye,
BY
Hood & Schley
ATTORNEYS

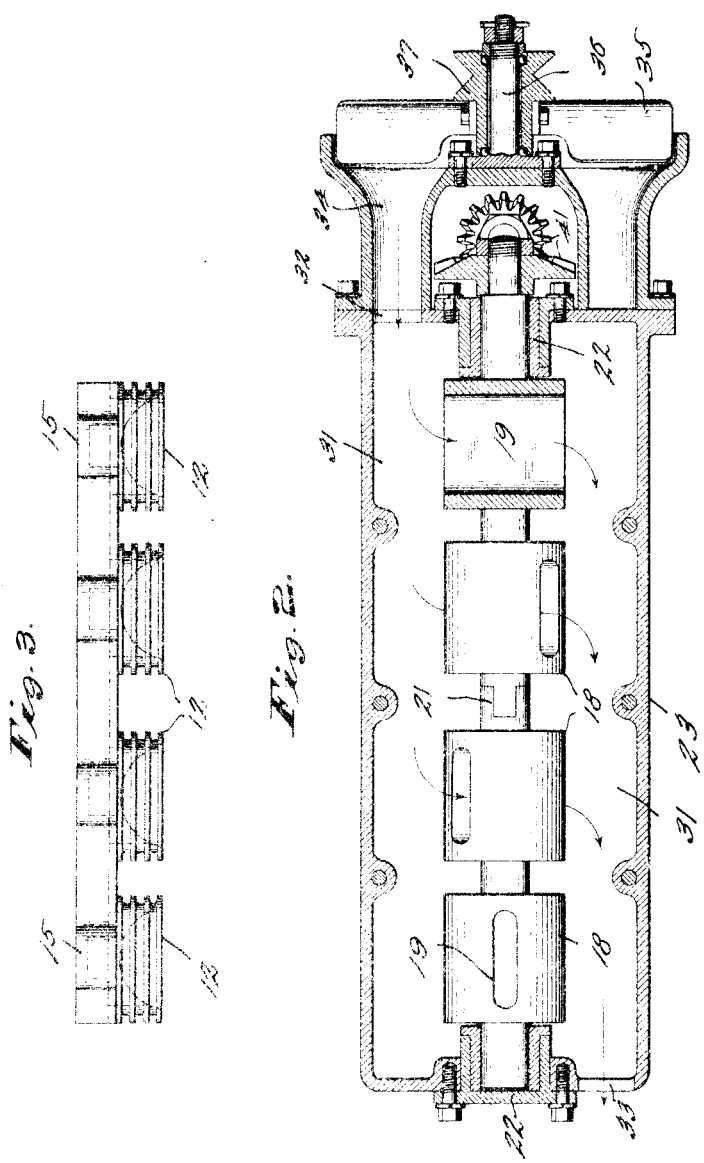

UNITED STATES PATENT OFFICE.

HERMAN C. BLYE, OF INDIANAPOLIS, INDIANA, ASSIGNOR OF ONE-HALF TO WILBERT F. BLYE, OF TERRE HAUTE, INDIANA.

INTERNAL-COMBUSTION ENGINE.

1,181,974.

Specification of Letters Patent.  Patented May 2, 1916.

Application filed March 1, 1915. Serial No. 11,136.

*To all whom it may concern:*

Be it known that I, HERMAN C. BLYE, a citizen of the United States, residing at Indianapolis, in the county of Marion and State of Indiana, have invented a new and useful Internal-Combustion Engine, of which the following is a specification.

The object of my invention is to produce improvements in the valve structure of an internal combustion engine of such character that a cylindrical rotary valve may be used; a gas-tight joint be maintained therewith at all times and the valve cooled by direct contact with a cooling stream of air forced automatically through the port of the valve at each half revolution thereof.

The accompanying drawings illustrate my invention.

Figure 1 is an axial section through one of the cylinders of an engine equipped with my improved valve; Fig. 2 is a section on line 2—2 of Fig. 1; and Fig. 3 is a side elevation, with the packing rings removed, of the flexible seat structure for a four-cylinder engine.

In the drawings, 10 indicates a cylinder and 11 a coacting piston mounted in the cylinder. The cylinder head comprises a cylindrical portion 12, equipped with packing rings 13, which fits the cylinder. The cylinder head also comprises a pair of oppositely extending arms 15, 15, which form seats for supporting springs 16, 16, which normally urge the cylinder head upwardly, and the cylinder head is provided in its upper face with a segmental valve seat 17 in which the cylindrical valve 18 is adapted to rotate.

The valve 18 may be in several sections, as indicated in Fig. 2, there being one section for each cylinder and each of these sections is provided with a single diametrical port 19. The valve structure may be made in several sections connected by tongue-and-groove connections 21, if desired, and is supported at its ends in suitable bearings 22 carried by a casing 23 which is mounted upon the upper end of the cylinder structure so as to inclose the cylinder head already described. Adjacent each cylinder 10, the casing 23 is provided with two oppositely extending passages 24 and 25 which communicate with a downwardly presented segmental seat 26 which lies opposite the seat 17 and receives the valve 18. The passage 24 is the exhaust passage and delivers to an exhaust manifold 28, while the passage 25 is an inlet passage and communicates with the inlet manifold 27.

The seat 26 is angularly spaced from the seat 17 at each end a distance greater than the angular extent of the port 19 so that the valve is exposed to the contents of the two chambers 31, 31 which are formed within the casing 23 and so that each of the ports 19 is compelled twice in each rotation of the valve to form a direct connection from one chamber 31 to the other. One of the chambers 31 is provided at one end with an inlet port 32 and the other chamber 31 is provided at its opposite end with an outlet port 33. Registering with port 32 is an inlet structure 34 through which air may be driven by means of a fan 35 mounted on a stud shaft 36 and provided with a suitable driving pulley 37.

By the above arrangement, the two chambers 31 are kept constantly filled with a moving current of air which passes from one chamber to the other successively through the several valve ports 19 and, because of this action and because the cooling air currents come into direct contact with the external surface of the valve, the valve is kept cool, the absorption of heat being directly from the valve by the cooling medium, instead of through bearing surfaces in the ordinary manner.

The valve will, of course, be connected by suitable gears 41 to be driven in proper timed relationship to the pistons of the engines.

The head 12 is perforated by an exhaust passage 42 and an inlet passage 43, which extend into the seat 17 in proper positions to register with the port 19 when it registers with the ports 24 and 25, respectively.

The cylinder heads may be provided with passages 44 through which a cooling medium may be circulated and may also be provided with an oil conduit 45 which opens into the seat 17.

It will be noticed that by providing the movable cylinder head which also forms a seat for the rotary valve, a closer association of the valve with its seat is obtained when the pressures are greater, but that at all times the seats are free to be accommodated to variations in the valve. It is desirable that the several cylinder head structures be incorporated into a single structure, both for convenience in production and also to balance the pressure on the valve.

I claim as my invention:

1. In an engine, the combination with the cylinder, of a movable head mounted in said cylinder and provided with a valve seat in its outer end, a rotary valve mounted in said seat, a second seat for said valve spaced from the first seat, and air circulation passages flanking the valve between the two seats to directly cool the same.

2. In an engine, the combination with the cylinder, of a movable head mounted in said cylinder and provided with a valve seat in its outer end, a rotary valve mounted in said seat, a second seat for said valve spaced from the first seat, air passages flanking the valve between the two seats, and means for causing a circulation of air through said flanking passages and the ports of the valve.

3. In an engine, the combination with a cylinder, of a rotary valve controlling induction and eduction to said cylinder, and a pair of separated seats for said valve, and a casing structure inclosing said valve between the seats to form a flanking air circulation passage immediately adjacent the valve to directly cool the same.

4. In an engine, the combination with a cylinder, of a rotary valve controlling induction and eduction to said cylinder, and a pair of separated seats for said valve, a casing structure inclosing said valve between the seats to form a flanking air passage immediately adjacent the valve, and means for causing a circulation of air through said flanking passage and the ports of the valve.

In witness whereof, I have hereunto set my hand at Indianapolis, Indiana, this 25th day of February, A. D. one thousand nine hundred and fifteen.

HERMAN C. BLYE.

Witnesses:
WILBERT F. BLYE,
ARTHUR M. HOOD.